J. L. THEOBALD.
WEIGHING SCALE.
APPLICATION FILED JAN. 27, 1915.
1,278,788.
Patented Sept. 10, 1918.
2 SHEETS—SHEET 1.
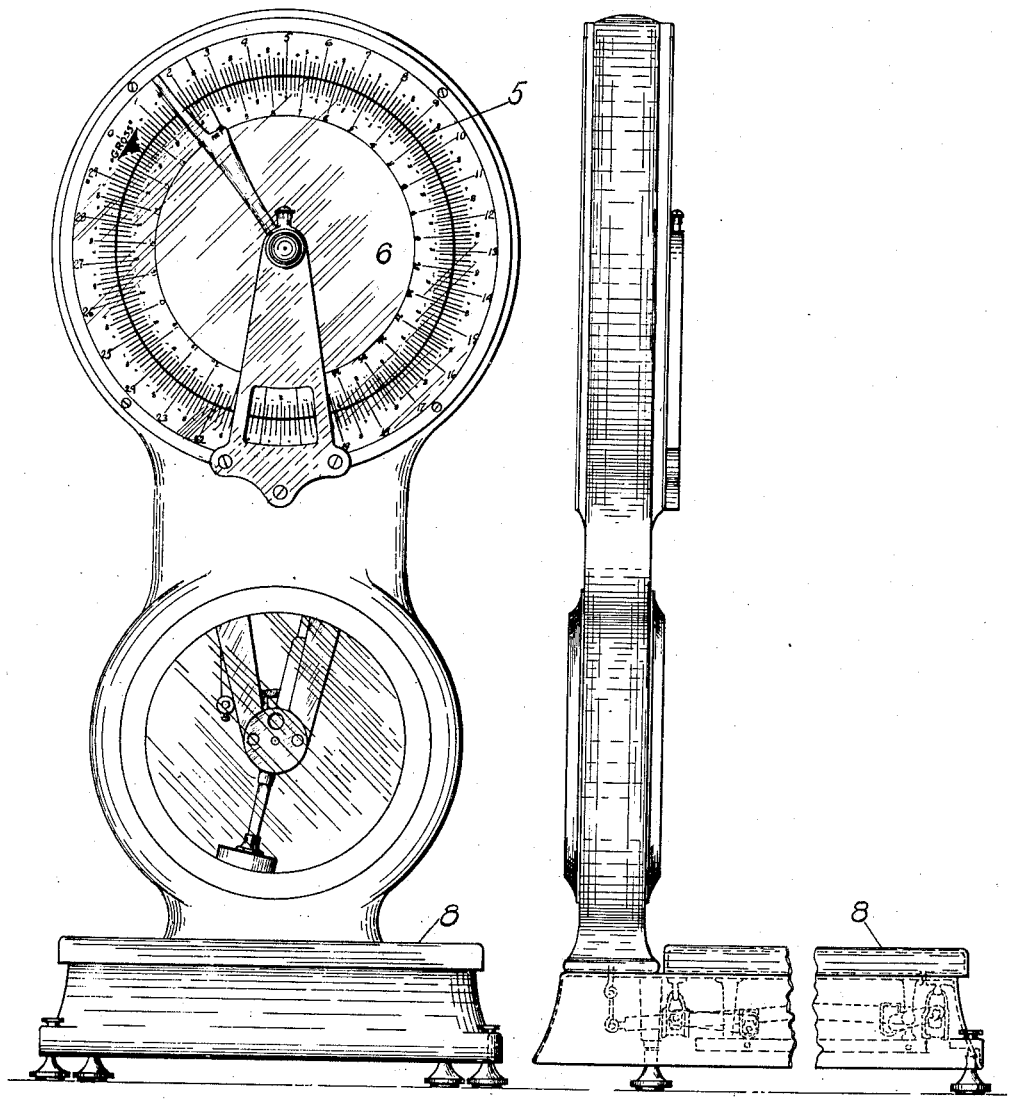
FIG_1
FIG_2
WITNESSES:
Frank M. Ronk
Carl J. E. Ginke
INVENTOR.
John L. Theobald
by George R. Frye
ATTORNEY

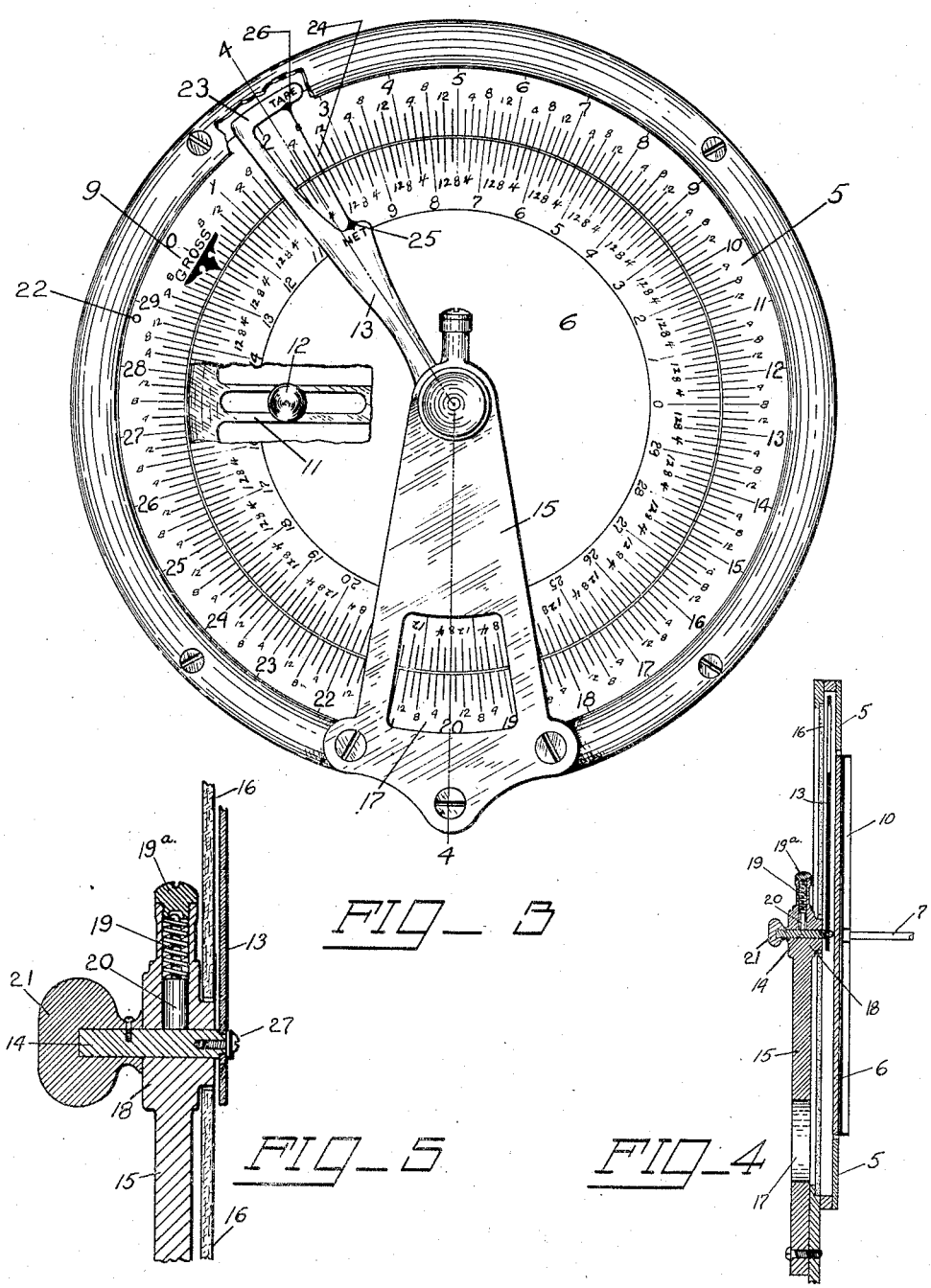

UNITED STATES PATENT OFFICE.

JOHN L. THEOBALD, OF NEW YORK, N. Y., ASSIGNOR TO TOLEDO SCALE COMPANY, OF TOLEDO, OHIO, A CORPORATION OF NEW JERSEY.

WEIGHING-SCALE.

1,278,788.   Specification of Letters Patent.   Patented Sept. 10, 1918.

Application filed January 27, 1915.   Serial No. 4,649.

*To all whom it may concern:*

Be it known that I, JOHN L. THEOBALD, a citizen of the United States, residing at New York, in the county of New York and State of New York, have invented certain new and useful Improvements in Weighing-Scales, of which the following is a specification.

This invention relates to weighing scales, and has for its object to provide a scale having indicating means arranged to conveniently and accurately indicate the net, gross, and tare weights of articles being weighed, so that all of these various weights can be immediately ascertained without requiring any mental calculation on the part of the operator; furthermore, this invention provides a means for indicating separate weighings, without removing any of the commodities or articles thus separately weighed from the platform of the scale until the full weighings of such commodities or articles has been completed, thereby enabling the operator to keep together and intact an invoice of goods for delivery or shipment; or for accurately weighing the several ingredients that enter into a compound of medicine, a mixture of bread, cake or confection, or the formula of an alloy of metals, the compounding whereof is performed without necessitating the removal of the container or holding vessel from the platform of the scale.

A further object of the invention is to provide a scale that while well adapted to indicate net, gross and tare weights may be also used as an ordinary weighing machine, in which case the index hand is set back in alinement with the zero graduation (marked "Gross" on the outer dial) and remains permanently in this position, indicating in conjunction with the gross indicator the correct weight of all such ordinary weighings; or this may be formed with a portion of the indicating mechanism removable to allow its ready detachment when the scale is intended for ordinary weighing—*i. e.* to indicate only the gross weight of an article being weighed—and as readily attached into its original position when it is again desired to use the scale for indicating net, gross and tare weights.

With the above and other objects in view which will more readily appear as the invention is better understood, my invention consists in the novel construction, combination and arrangement of parts to be hereinafter more fully described and particularly pointed out in the subjoined claims.

Reference is to be had to the accompanying drawings, illustrating a preferred embodiment of my invention and wherein similar reference numerals designate similar parts throughout the several views.

In the drawings,

Figure 1 is a front elevation of a scale showing an embodiment of my invention.

Fig. 2 is a side elevation thereof, with the platform partly broken away.

Fig. 3 is an enlarged elevation of the indicating mechanism, with parts broken away.

Fig. 4 is a section through the indicating mechanism taken substantially on the line 4—4 of Fig. 3, and Fig. 5 is an enlarged sectional view through the manually-operated indicating hand and its supporting bracket.

In the drawings, 5 designates an outer or fixed dial suitably secured to the framework of the scale and preferably formed as a ring encircling the inner movable dial 6, which is rotatably mounted upon the indicator shaft 7 suitably connected to and actuated from the weighing mechanism of the scale to rotate through a suitable arc to correctly indicate the weight of the article placed upon the platform 8 of the scale.

It is to be understood that the weighing mechanism of the scale may be of any approved type, and that the connections for suitably driving the indicator shaft 7 therefrom upon the imposition of the load upon the scale platform may be of any desired form, various mechanisms well known in the scale art being fully capable of performing the required functions. The embodiment herein illustrated is one that has been found to successfully demonstrate the capabilities of this invention, and shows a pendulum scale of a well known type with my improved indicating mechanism suitably actuated in accordance with the displacement of the pendulum from its normal position, but it is to be understood that other types or forms of scales could also be used.

The outer dial 5 is suitably graduated for weight indication, and these indications as herein shown are arranged to progress in a clockwise direction with the zero mark positioned at a point about 60° removed from the vertical diameter of the dial. At this zero mark is suitably inscribed a pointer or guide-mark 9 having its inner end reduced and arranged to coöperate with the inner or movable dial 6 to indicate weights upon this movable dial. Also to facilitate the reading of the weight indications and aid in instantly distinguishing the various indications from each other, the word "Gross" is preferably marked above the pointer or guide-mark 9 on the outer dial.

The inner or movable dial 6 has its weight graduations arranged to progress in a counter-clockwise direction, or in a reverse direction from the weight indications upon the outer or fixed dial, and the graduations upon both dials are preferably arranged in radial lines, extending from the same center so that when the scale is at rest and the dials are in normal position the graduations on both dials will aline.

In order to insure the correct balancing of the inner dial so that it will always rotate evenly, this dial is secured upon a bracing frame 10, formed with slotted radiating arms 11, in the slots of which are adjustable weights 12 which can be moved to approach or recede from the periphery of this frame 10 to permit of accurate adjustments in balancing the rotatable dial 6.

Arranged to coöperate with the graduations upon both the removable and fixed dials is a manually-adjustable index-hand 13 carried by a stub shaft 14 mounted in a supporting bracket 15 suitably secured to the framework of the scale in front of the dials and inclosing glass plate 16, the bracket being provided with an aperture 17 to permit observation of the dial graduations at this point.

The upper portion of the bracket 15, as herein shown, is formed with a sleeve 18 providing a bearing for the stub shaft and upwardly extending from the bore of this sleeve is an aperture 19 in which is suitably arranged a spring-pressed plunger 20, the face of which is adapted to firmly bear upon the shaft 14 to hold this shaft in any adjusted position, but which allows the turning of this shaft 14 when sufficient force is applied thereto, as when the knob 21 carried by said shaft is grasped by the hand and rotated. The wall of the aperture 19 is preferably threaded at its upper portion to receive a cap 19ª, by means of which the tension on the plunger spring may be adjusted.

A suitable projection 22 is also carried by a fixed portion of the scale to prevent rotation of the index-hand beyond the zero point on the outer dial.

The index hand 13 is preferably constructed with its upper portion of reduced width, the top 23 of the index-hand being forwardly bent, and a reading wire 24 is stretched between this top portion 23 and the body portion of the index hand, this reading wire extending across the graduations on both the fixed and movable dials so as to coöperate with each in indicating weights. To particularly show the exact point of coöperation with the inner or movable dial 6, a pointer or guide-mark 25 projects from the body portion of the index-hand, and since this pointer is most commonly used to indicate the net weights of articles being weighed, as hereinafter pointed out, the word "Net" is preferably marked on the index-hand adjacent this guide-mark 25. Similarly the guide-mark or pointer 26 projects inwardly from the top portion 23 of the index-hand and coöperates with the outer or fixed dial 5 in indicating tare weights as hereinafter pointed out, and so the word "Tare" is preferably marked on the top portion 23 adjacent this guide-mark 26.

In the operation of the scale, the container, such as a box or crock, is first placed upon the scale platform and the inner dial 6 revolves in a clock-wise direction until the weight of the container is indicated thereon, by the pointer or guide-mark 9 marked upon the fixed dial, and if the index-hand 13 is in registry with this pointer 9, this weight will, of course, likewise be indicated by the reading wire 24 thereof. This index-hand is then moved until the reading wire is over the zero of the rotatable inner dial in its adjusted position. The commodity to be weighed is then placed in the container and the net weight of this commodity may be read on the inner dial under the wire of the index-hand after this dial 6 has again been rotated by the weighing mechanism of a scale in off-setting the weight of the commodity, and the gross weight of the container and commodity may be read either on the inner dial opposite the pointer 9 or on the outer dial opposite the 0 of the rotatable dial. The "tare," i. e., the weight of the container is, of course, shown on the outer dial under the wire of the index-hand.

For example, set the indicating hand so it registers with the "gross" pointer 9 on the outer chart and the zero graduation on the inner chart; place 2½ pounds on the platform of the scale, the inner dial revolves until the 2 lb. 8 ounce graduation on the inner chart registers with the pointer 9 on the outer chart and the reading wire of the index-hand, the zero graduation on the inner chart registers with the 2 lb. 8 ounce graduation on the outer chart; move the index-hand forward so reading wire thereof bisects the zero graduation on the inner chart, now without removing the original article that was weighed from the platform of the scale, place 10 lbs. on the platform, the inner chart revolves showing 12 lbs. 8 ounces in registration with the "gross" indication on the outer dial and the zero graduation of the inner dial registers with the 12 lb. 8 ounce graduation on the outer dial, and the reading wire of the index-hand bisects 10 lbs. on the inner dial, being the weight of the last article placed on the platform of the scale, said reading wire also bisects the 2 lb. 8 ounce graduation on the outer dial, the amount of weight on the platform of the scale prior to the last weighing. (See Fig. 3.) Now the weighing of articles can readily be continued without removing the articles already on the platform, as, for example, move the index-hand forward so the reading wire thereof again bisects the zero graduation on the inner dial, place 10 lbs. on the platform, the inner dial revolves and now shows 22 lbs. 8 ounces in registration with the "gross" indication on the outer dial and the zero graduation on the inner dial registers with the 22 lb. 8 ounce graduation on the outer dial, the reading wire of the index-hand now bisects 10 lbs. on the inner dial, the last weighing made and 12 lbs. 8 ounces on the outer dial, the total of weight on platform of scale prior to last weighing.

This operation can be repeatedly performed until the full capacity of the dial has been reached, and in case the scale is also equipped with tare and capacity beams, the weights thus totaled can be transferred to the tare and increased capacity beams, thereby returning the inner dial back so the zero graduation thereon would register with the "gross" indication on the outer dial, and separate weighings and additions could be continued to the full weighing capacity of the scale.

If it is desired to use the scale for ordinary weighing only i. e., for indicating only one weight of an article being weighed, the index-hand may be set back in alinement with the zero graduation on the outer dial and remain permanently in this position, the reading wire then acting in conjunction with the "gross" pointer 9 on the outer dial in indicating weights, or the bracket 15 and the inclosing glass 16 may be removed from their normal position and the index-hand 13 detached from the shaft 14 after removing the retaining screw 27, whereupon the glass plate 16 is removed from the bracket and returned to the position shown herein, and the scale is ready for use as an ordinary weighing machine. When the index-hand 13 is detached, the weight of an article placed on the scale platform is indicated at the point of the pointer 9 upon the outer dial, the inner dial being revolved by the weighing mechanism through a suitable arc to indicate the weight of the article.

It is to be understood, of course, that the pointer or guide-mark 9 need not be positioned at the point on the outer dial herein shown, though this is an advantageous position when the scale is used for indicating gross, tare and net weights, as the bulk of the tare of a 30 pound capacity scale such as herein shown would not exceed 10 or 12 pounds at the utmost and by locating this guide-mark 9 at a point substantially 60° removed from the vertical diameter of the dial all of the "tare" readings would be above a horizontal line passing through the center of the dials, where they can be most easily read. If, however, the scale is used only for ordinary weighing it would possibly be more advantageous to locate this pointer 9 at the top of the outer dial or in any other suitable position.

From the above it will be evident that this combination of two charts of unequal peripheries, the outer chart stationary and the inner chart automatically rotating in either direction, the pound and ounce graduations of the two charts being in complement, the manually movable index-hand, and all apparatus and accessories therewith, used in determining weight and combinations of which severally and jointly and in sum total, is applicable to and can be combined in automatic hanging scales, automatic counter scales, automatic abattoir track scales, autoportable and dormant scales, and automatic railroad track scales, in fact, in any style or type of automatic scales now being constructed, the capacity of the automatic weighing of any and all such scales in no way interfering with or detracting from the accuracy and efficiency of said combination.

I claim:

1. In a weighing scale, a fixed dial bearing weight graduations, a graduated rotatable dial, means connecting the rotatable dial with the weighing mechanism of the scale to indicate the weight of articles being weighed, a manually-operated indicator independently mounted exteriorly of the dials, and a reading wire carried by said indicator and extending across the graduations on both the fixed and rotatable dials.

2. In a weighing scale, a fixed dial bearing weight graduations, a rotatable shaft, means connecting said shaft with the weighing mechanism of the scale, a dial bearing weight graduations and mounted on said shaft to rotate therewith, a manually-operated indicator loosely mounted adjacent said shaft and arranged to coöperate with both the fixed and rotatable dials in indicating weights, said indicator being readily removable from its operative position.

3. In a weighing scale, a dial bearing weight graduations secured to the framework of the scale, a graduated rotatable dial, means for connecting the rotatable dial with the weighing mechanism of the scale to indicate weights, a bracket removably secured to the framework of the scale adjacent the fixed dial, and a manually-operated indicator loosely mounted in said bracket and arranged to coöperate with both the fixed and rotatable dials in indicating weights.

4. In a weighing scale, a dial bearing weight graduations secured to the framework of the scale, a graduated rotatable dial, means for connecting the rotatable dial with the weighing mechanism of the scale to indicate weights, a bracket secured to the framework of the scale adjacent the fixed dial and having a sleeve formed therein, a manually-operated indicator loosely mounted in said sleeve and arranged to coöperate with both the fixed and rotatable dials in indicating weights, and a spring-pressed plunger carried by said bracket and arranged to bear against said indicator to hold the indicator in any adjusted position.

JOHN L. THEOBALD.

Witnesses:
I. J. POCHER,
WILLIAM J. MAHNKIN.